Nov. 13, 1956     J. J. HEGARTY     2,770,381
SUSPENSION APPARATUS FOR USE WITH LOAD CARRYING MECHANISM
Filed July 2, 1954.     2 Sheets-Sheet 1
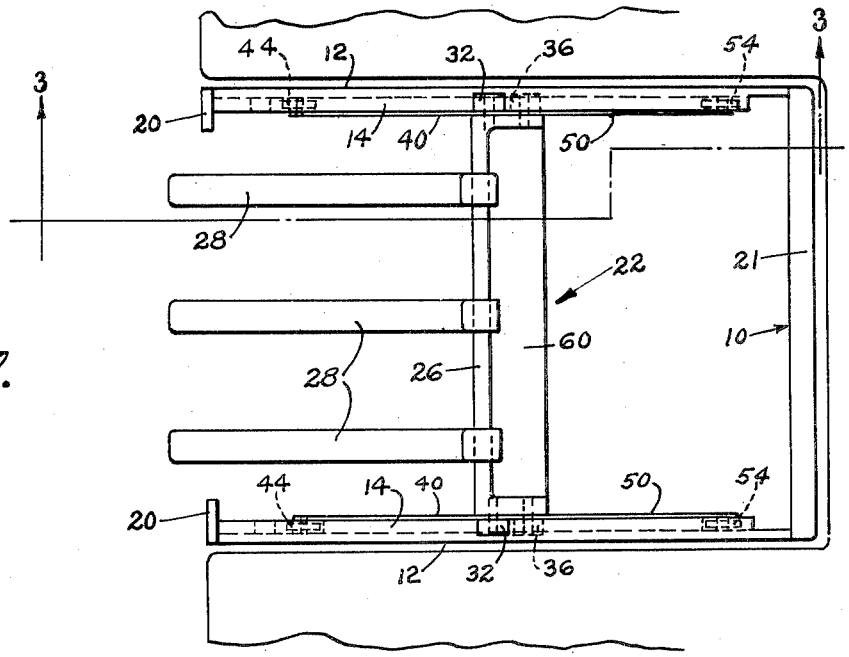
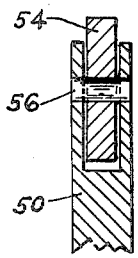
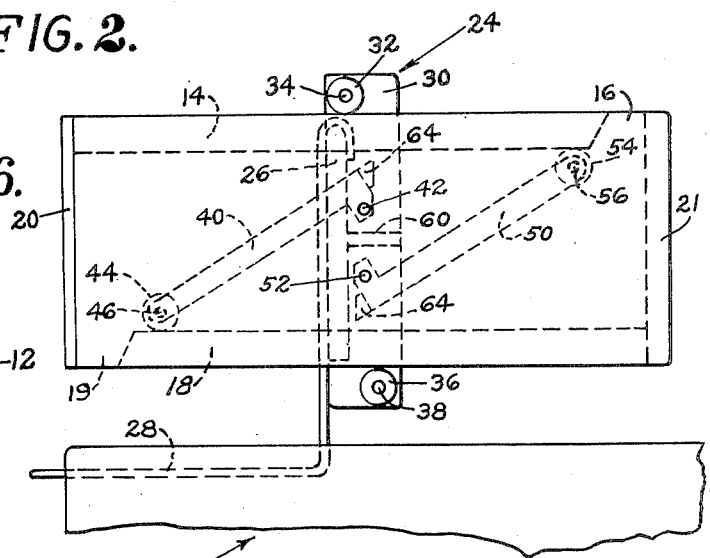
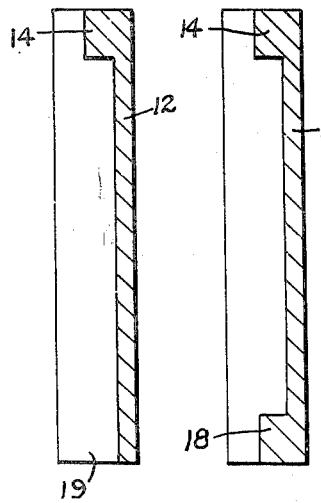
INVENTOR.
John J. Hegarty
BY Harold E. Cole
Attorney

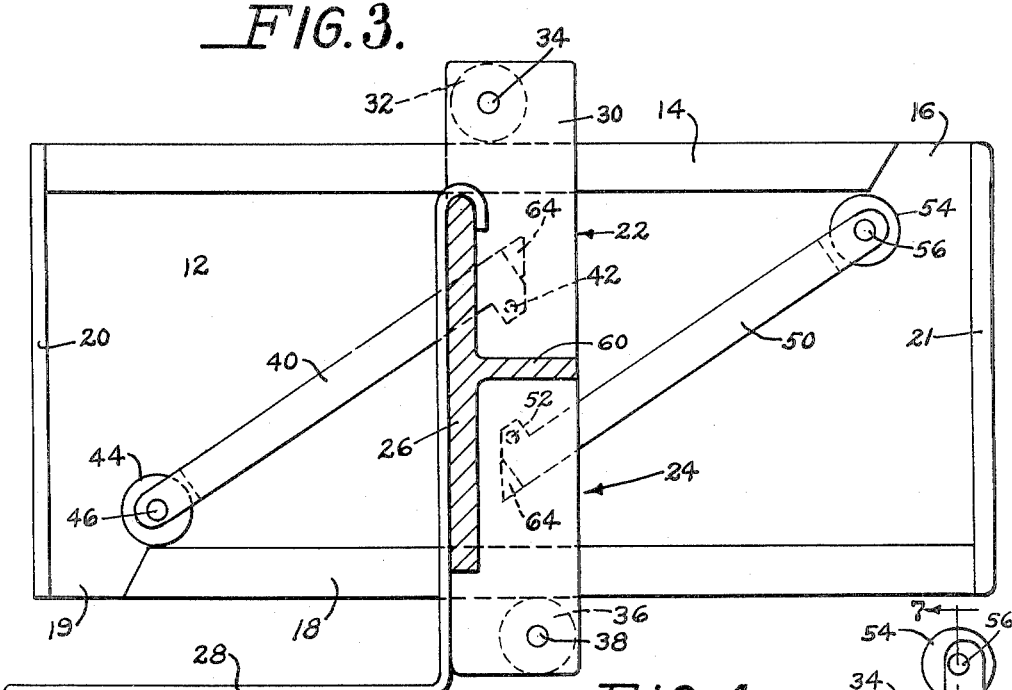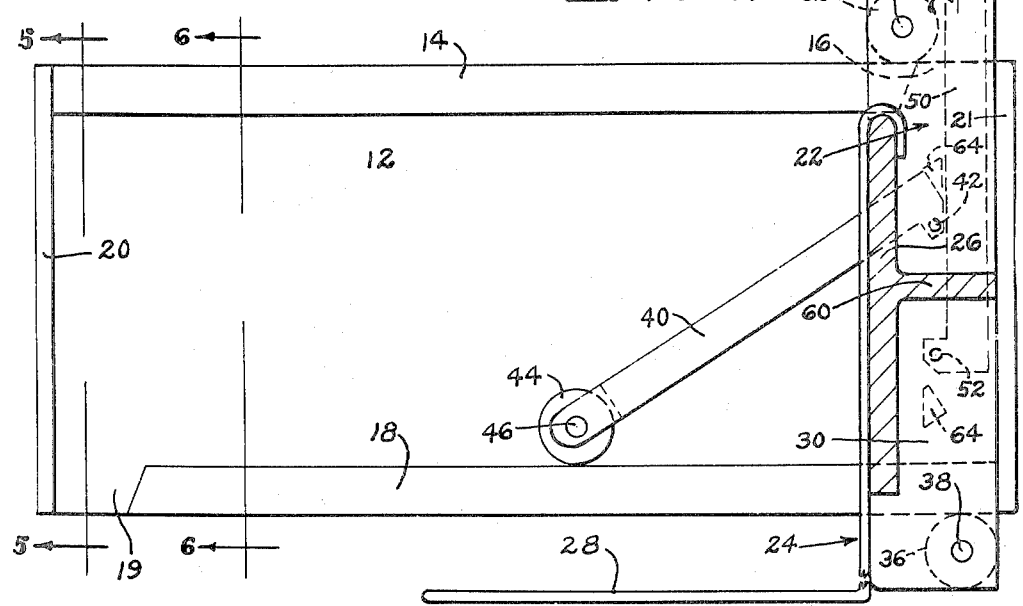

United States Patent Office 2,770,381
Patented Nov. 13, 1956

2,770,381

SUSPENSION APPARATUS FOR USE WITH LOAD CARRYING MECHANISM

John J. Hegarty, Medford, Mass.

Application July 2, 1954, Serial No. 440,963

7 Claims. (Cl. 214—731)

This invention relates to suspension apparatus for lightening the load-strain on the bearings of a load supporting carriage.

Reference is made to my Patent No. 2,591,544 issued April 1, 1952, for a Stacking Truck, this application disclosing an improvement applicable thereto.

The principal object of my invention is to provide suspension apparatus that assumes part of the load-strain on the bearings of a load supporting carriage.

A further object is to so construct and mount said apparatus that part of it, at least, assumes a substantial part of said load-strain at all times during either forward or rearward movement of said carriage.

A still further object is to so construct said apparatus that it is simple to manufacture, and certain in operation.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

In the drawings:

Figure 1 is a top plan view of my apparatus.

Figure 2 is a side elevational view thereof.

Figure 3 is an enlarged, sectional view taken on the line 3—3 of Figure 1, the carriage being shown in an intermediate position.

Figure 4 is a view similar to Figure 3; but showing the carriage in normal or rearward position.

Figure 5 is a sectional view taken on the line 5—5 of Figure 4.

Figure 6 is a sectional view taken on the line 6—6 of Figure 4.

Figure 7 is an enlarged, sectional view taken on the line 7—7 of Figure 4.

As illustrated, a carriage supporting member 10 is U-shaped, as shown, and may be fixedly mounted on a self-propelled vehicle or the like, as disclosed in my said Patent No. 2,591,544. This supporting member has two sides 12 each of which has an upper track 14 fixed thereto at the upper part, the rear end of which track 14 extends diagonally upward and rearward and terminates prior to the rear end of its said side 12 to thereby provide a space or passage 16 beyond said track that is opposite its said side. Each said side 12 also has a lower track 18 fixed thereto at the lower part, the front end of which lower track 18 extends diagonally downward and forward and terminates prior to the front end of its said side 12 to thereby provide a space or passage 19 beyond said track that is opposite its said side. A stop member 20 is attached at the front of each said side 12 and a bridge member 21 is attached at the rear of and connects said sides 12.

Movable along said sides 12 is a carriage 22 which has a suspension member 24 at each side thereof and a bridge or connecting member 26 between and connected to said two side suspension members 24. Loading forks 28 for picking up and carrying a load are attached to said carriage crosspiece 26 and extend forwardly beyond it. Each said suspension member 24 has a frame 30, shown as a flat plate, on which is rotatably mounted an upper roller 32 by means of a shaft 34 that runs on a said upper track 14. Also mounted on said frame 30 is a lower roller 36 that is rotatably mounted on said body by a shaft 38 and which runs on said lower track 18.

A brace or bearing support 40 is pivotally mounted on a said frame 30 by a pivot pin 42 and extends from an intermediate part of said frame downwardly to a point beyond said roller or bearing 36 and it carries a roller 44 pivotally mounted on the frame by a shaft 46.

Another brace or bearing support 50 is pivotally mounted on another said frame 30 by a pivot pin 52 and extends from an intermediate part of said frame upwardly to a point beyond said roller 32 and it carries a roller 54 pivotally mounted on said frame by a shaft 56.

Said suspension members 24 have a reinforcing cross plate 60 attached to said frames 30 and extending between them. It is also attached to said connecting member 26. Each said suspension member 24 has a diagonally extending stop member 64 fixed to a said frame 30 to limit the movement of a said brace laterally or away from said frame 30.

Said upper rollers 32 run along the upper edges of said upper tracks 14 and said lower rollers 36 run along the lower edges of said lower tracks 18 to permit free movement of the carriage 22 forward and backward. Said rollers 44 roll on the upper edges of said lower tracks 18 to permit free movement of the carriage 22 forward and backward. Said rollers 44 roll on the upper edges of said lower tracks 18 when they are opposite them, and likewise said rollers 54 roll on the lower edges of said upper tracks 14 when they are opposite the latter tracks, as shown in Figure 2 of the drawings, thus permitting the braces 40 and 50 to assume part of the load on the forks 28, or otherwise stated, to reduce the strain on said rollers 32 and 36. When a roller 44, or 54, reaches the end of its track, it passes into a passage 16 or 19 respectively, and may take a vertical (non-functioning) position at the end of the movement of said carriage 22, as shown in Figure 4 of the drawings. Thus it will be seen that one of a pair of said braces 40 or 50 together with their rollers 44 or 54, assume part of the strain of the load on said forks 28, thus substantially relieving the strain on rollers 32 or 36.

What I claim is:

1. Suspension apparatus comprising a carriage supporting member embodying two sides laterally opposite each other, each said side embodying a pair of tracks at the upper and lower portions thereof, a suspension carriage movably supported by said supporting member and embodying two side suspension members and a connecting member attached to and extending between them, each said suspension member embodying a frame having two rollers rotatably attached thereto at upper and lower portions thereof which are respectively in contact with said upper and lower tracks, at the lower and upper edges respectively of the latter, and two braces pivotally mounted on said frame at an intermediate portion thereof and extending therefrom in opposite directions, each said brace having a roller rotatably mounted thereon, said latter rollers being adapted to contact and move along said tracks when opposite thereto.

2. Suspension apparatus comprising a carriage supporting member embodying two sides laterally opposite each other, each said side embodying a pair of tracks at the upper and lower portions thereof, each said track terminating at one end before the said side adjacent thereto terminates to thereby provide a passage directly opposite said side, a suspension carriage movably supported by said supporting member and embodying two side suspension members and a connecting member attached to and extending between them, each said suspension member embodying a frame having two rollers rotatably attached thereto at upper and lower portions thereof which are respectively in contact with said upper and lower tracks, and two braces pivotally mounted on said frame at an intermediate portion thereof and extending therefrom in opposite directions, each said brace having a roller rotatably mounted thereon, said latter rollers being adapted to contact and move along said tracks when opposite thereto and adapted to pass through said passages when said suspension carriage approaches the limit of its movement forwardly or rearwardly.

3. Suspension apparatus comprising a carriage supporting member embodying two sides laterally opposite each other, each said side embodying a pair of tracks at the upper and lower portions thereof, each said track terminating at one end before the said side adjacent thereto terminates to thereby provide a passage directly opposite said side, a suspension carriage movably supported by said supporting member and embodying two side suspension members and a connecting member attached to and extending between them, each said suspension member embodying a frame having two rollers rotatably attached thereto at upper and lower portions thereof which are respectively in contact with said upper and lower tracks, and two braces pivotally mounted on said frame at an intermediate portion thereof and extending therefrom in opposite directions, each said brace having a roller rotatably mounted thereon, said latter rollers being adapted to contact and move along said tracks when opposite thereto and adapted to pass through said passages when said suspension carriage approaches the limit of its movement forwardly or rearwardly, each said frame embodying two stop members adjacent said braces and adapted to limit the rotative movement of said braces away from each other.

4. Suspension apparatus comprising a carriage supporting member embodying two sides laterally opposite each other, each said side embodying a pair of tracks at the upper and lower portions thereof, each said track terminating at one end before the said side adjacent thereto terminates to thereby provide a passage directly opposite said side, a suspension carriage movably supported by said supporting member and embodying two side suspension members and a connecting member attached to and extending between them, each said suspension member embodying a frame having two rollers rotatably attached thereto at upper and lower portions thereof which are respectively in contact with said upper and lower tracks, and two braces pivotally mounted on said frame extending in upward and lower directions, said upper and lower braces respectively having rollers rotatably mounted thereon adjacent their outer ends and adapted to contact said upper and lower tracks respectively and move along said tracks when opposite thereto and adapted to pass through said passages when said suspension carriage approaches the limit of its movement forwardly or rearwardly.

5. Suspension apparatus comprising a carriage supporting member embodying two sides laterally opposite each other, each said side embodying a pair of tracks at the upper and lower portions thereof, a suspension carriage movably supported by said supporting member and embodying two side suspension members and a connecting member attached to and extending between them, each said suspension member embodying a frame having two bearing members movably attached thereto which are in contact with said upper and lower tracks, and two braces pivotally mounted on said frame each brace having a bearing member movably mounted thereon adapted to contact and move along said tracks when opposite thereto, each said brace always extending diagonally when in moving position.

6. Suspension apparatus comprising a carriage supporting member embodying two sides laterally opposite each other, each said side embodying a pair of tracks at the upper and lower portions thereof, a suspension carriage movably supported by said supporting member and embodying two side suspension members and a connecting member attached to and extending between them, each said suspension member embodying a frame having two bearing members movably attached thereto which are in contact with said upper and lower tracks, and two braces pivotally mounted on said frame each brace having a bearing member movably mounted thereon adapted to contact and move along said tracks when opposite thereto, said sides each having provision at the end of one said track whereby said latter bearing members can pass beyond said tracks when approaching the end of a forward or rearward movement of said carriage.

7. Suspension apparatus comprising a carriage supporting member embodying two fixed sides laterally opposite each other, each said side embodying a pair of tracks at the upper and lower portions thereof, a suspension carriage movably supported by said supporting member and embodying two side suspension members and a connecting member attached to and extending between them, each said suspension member embodying a frame having two bearing members movably attached thereto which are in contact with said upper and lower tracks, and two braces pivotally mounted on upper half and lower half portions of said frame and extending therefrom respectively downward and upward in directions away from each other, each brace having a bearing member movably mounted thereon adjacent an end thereof adapted to contact and move along said tracks when opposite thereto.

References Cited in the file of this patent

UNITED STATES PATENTS

| | | |
|---|---|---|
| 1,543,292 | Murdock | June 23, 1925 |
| 1,701,013 | Ronk | Feb. 5, 1929 |
| 2,325,896 | Waller | Aug. 3, 1943 |
| 2,590,355 | Turner et al. | Mar. 25, 1952 |
| 2,591,544 | Hegarty | Apr. 1, 1952 |

FOREIGN PATENTS

| | | |
|---|---|---|
| 102,783 | Great Britain | Dec. 28, 1916 |
| 679,285 | Great Britain | Sept. 17, 1952 |